United States Patent [19]

Hashimoto et al.

[11] Patent Number: 5,322,474

[45] Date of Patent: Jun. 21, 1994

[54] SPRING DAMPENED DAMPER DISC HAVING FIRST AND SECOND STAGE TORSION SPRINGS

[75] Inventors: Yasuyuki Hashimoto; Takuji Yoshimura; Syogo Ohga, all of Neyagawa, Japan

[73] Assignee: Kabushiki Kaisha Daikin Seisakusho, Neyagawa, Japan

[21] Appl. No.: 995,922

[22] Filed: Dec. 22, 1992

Related U.S. Application Data

[63] Continuation of Ser. No. 819,649, Jan. 10, 1992, abandoned, which is a continuation of Ser. No. 434,693, Nov. 2, 1989, abandoned.

[30] Foreign Application Priority Data

| Mar. 9, 1988 | [JP] | Japan | 63-31419[U] |
|---|---|---|---|
| Mar. 9, 1988 | [JP] | Japan | 63-33461[U] |
| Mar. 9, 1988 | [JP] | Japan | 63-55825 |
| Mar. 23, 1988 | [JP] | Japan | 63-38836[U] |
| Jun. 26, 1988 | [JP] | Japan | 63-84777[U] |

[51] Int. Cl.$^5$ .............. F16D 3/14; F16D 13/64; F16F 15/12
[52] U.S. Cl. .............. 464/68; 192/106.2; 464/64
[58] Field of Search ............ 464/63, 64, 66, 68, 464/81; 192/106.2

[56] References Cited

U.S. PATENT DOCUMENTS

| Re. 32,705 | 6/1988 | Lamarche | 464/68 |
|---|---|---|---|
| 4,493,674 | 1/1985 | Tamura et al. | 464/68 |
| 4,530,673 | 7/1985 | Lamarche | 464/68 X |
| 4,585,427 | 4/1986 | Lamarche | 464/68 X |
| 4,591,348 | 5/1986 | Takeuchi et al. | 464/64 |
| 4,613,029 | 9/1986 | Beccaris | 464/68 X |
| 4,655,337 | 4/1987 | Carmillet et al. | 464/68 |

FOREIGN PATENT DOCUMENTS 59-147925 10/1984 Japan .

*Primary Examiner*—Daniel P. Stodola
*Attorney, Agent, or Firm*—Armstrong, Westerman, Hattori, McLeland & Naughton

[57] ABSTRACT

A damper disc having an output-side plate between a pair of side plates, containing two torsion springs in series in rectangular holes made on the both plates, and disposing a float body freely movable in circumferential direction between the springs. The output-side plate is divided into inside and outside pieces. Each float body is connected by an annular connecting body in such a manner as not to be protrudable. The float body is made of plastic-based resin light in weight and small in friction coefficient.

4 Claims, 10 Drawing Sheets

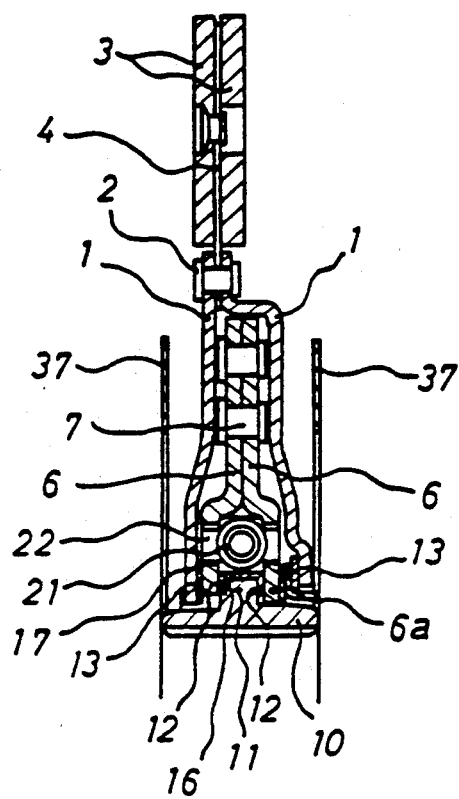
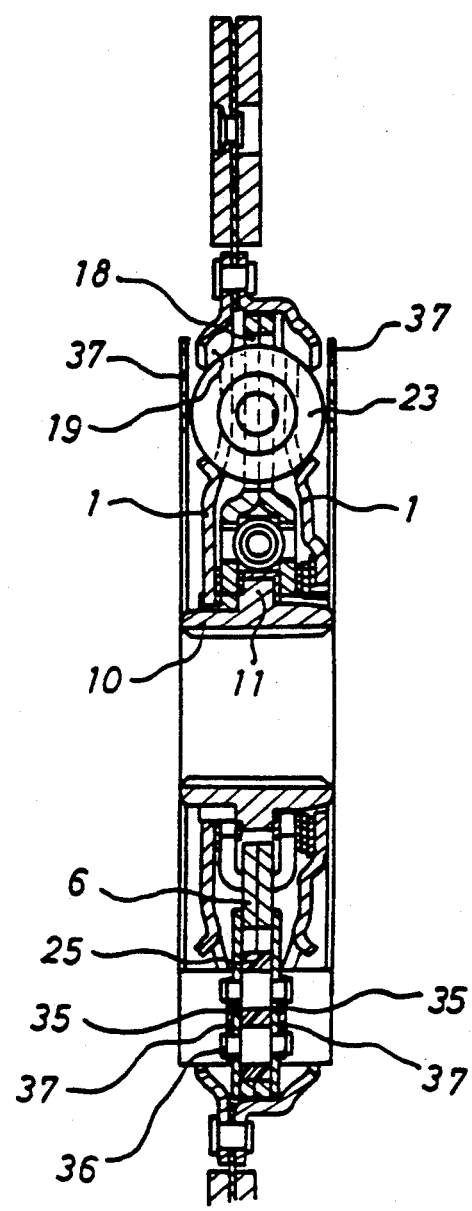

SPRING DAMPENED DAMPER DISC HAVING FIRST AND SECOND STAGE TORSION SPRINGS

This application s a continuation of application Ser. No. 07/819,649, filed Jan. 10, 1992, now abandoned, in turn a continuation of Ser. No. 07/434,693, filed Nov. 2, 1989, now abandoned.

TECHNICAL FIELD

This invention relates to a damper disc.

BACKGROUND ART

Generally, it becomes necessary to suppress torsional rigidity while retaining a required torque and enlarge a torsional angle range of second stage in order to minimize booming noise during low speed running.

On the other hand, it is necessary to secure an extremely low rigidity and an extremely small hysteresis torque in order to minimize idling noise during idling.

In a conventional damper disc, however, it is impossible to effectively minimize both the foregoing idling noise at the time of idling and the booming noise at the time of low-speed running because space in the damper is too small to incorporate first and second stage torsion springs.

An object of this invention is to minimize the idling noise while securing low rigidity and low hysteresis torque by separating an output-side plate to both inside and outside at the time of idling, and to minimize the noise in low-speed running (booming noise) while retaining a wide torsional angle range by disposing torsion springs in series through float bodies at the time of low speed running.

Further objects are to minimize friction between the float body and a rectangular hole as far as possible in case when the torsion springs are disposed in series through the float bodies.

A still further object is to simplify manufacture of the damper disc by separating the output-side plate into a hub flange and an intermediate plate located at an outside thereof and by composing the intermediate plate with two plate members.

DISCLOSURE OF THE INVENTION

In this invention; an output-side plate is separated into a flange integral with a spline hub and intermediate plates located at an outer peripheral side thereof, the intermediate plates are disposed between a pair of input-side side plates, the side plates are made contact with the intermediate plates through second-stage friction members, the foregoing intermediate plates are made contact with the flange of output-side hub through first-stage friction members having a small friction coefficient, a first-stage torsion spring having a small spring constant is disposed in a rectangular hole of the flange and first rectangular holes of the intermediate plates corresponding thereto, the flange is coupled to the intermediate plates through the foregoing first-stage torsion spring in such a manner that a torque is transmittable therebetween, second-stage torsion springs having a large spring constant are disposed in second rectangular holes of the intermediate plates and rectangular holes of the side-plates corresponding thereto in such a way that at least two springs are disposed in one hole in series, a float body movable in circumferential direction is interposed between the two second-stage torsion springs disposed in series, and the intermediate plates are coupled to the side plates through the foregoing torsion springs in the manner that a torque can be transmitted therebetween.

At the time of idling, the hub and intermediate plates are relatively twisted to compress the first-stage torsion spring having a small friction coefficient and a small hysteresis torque is generated by the first-stage friction members. Thereby, the idling noise can be minimized.

At the time of low-speed running, the second-stage torsion springs are compressed and, at the same time, a comparatively large hysteresis torque is generated by the second-stage friction members. The second-stage torsion springs are disposed in series through the float body so that a wide torsion angle can be secured by a comparatively small torsional rigidity, the booming noise can thereby be minimized at the time of low-speed running.

In an embodiment of this invention; rectangular holes for disposing torsion springs are made on a pair of input-side side plates and an output-side plate located between the foregoing side plates respectively, at least two torsion springs are disposed in series in one rectangular hole, the side plates and the output-side plate are coupled to each other by the torsion springs in such a manner that a torque is transmittable therebetween, a float body movable in circumferential direction is interposed between the two torsion springs disposed in series in one rectangular hole, and the above-mentioned float body is made of light plastic-based material having a small friction coefficient.

The two torsion springs coupled in series are compressed and the float body located between the torsion springs is simultaneously moved in circumferential direction. However, there is little possibility of occurrence of fretting even if the float body contacts with a radial outer peripheral side edge of the rectangular hole because it is made of resin having small friction coefficient. Its centrifugal force at time of rotation is small because of its light weight so that unstable hysteresis torque does not increase excessively by the movement of float body.

In another embodiment of this invention; plural rectangular holes for disposing torsion springs are formed on a pair of input-side side plates and an output-side plate located therebetween respectively, a radial outer peripheral end of the output-side plate is formed into annular shape so as to close radial outside edges of the rectangular holes, at least two torsion springs are disposed in series in each rectangular hole of the output-side plate; the side plates and the output-side plate are coupled by the torsion springs so that a torque is transmittable therebetween, a float body movable in circumferential direction is interposed between the two torsion springs located in series in each rectangular hole, and side faces of the float bodies are integrally connected by using annular connecting bodies.

When the float bodies are moving, they do not rub on peripheral edges of the rectangular holes by being pushed radially outwardly with centrifugal force because they are connected to each other by the annular connecting body. Consequently, fretting does not occur between the float bodies and the peripheral edges of rectangular holes and unstable hysteresis torque does not increase excessively by the movement of float body.

In a further embodiment of this invention; plural rectangular holes for disposing torsion springs are formed on a pair of input-side side plates and an output-side plate located therebetween respectively, a radial outer peripheral end of the output-side plate is formed into annular shape so as to close radial outside edges of the rectangular holes, at least two torsion springs are disposed in series in each rectangular hole of the output-side plate, the side plates and the output-side plate are coupled by the torsion springs so that a torque is transmittable therebetween, a float body movable in circumferential direction is interposed between the two torsion springs located in series in each rectangular hole, guide plates are secured to both axial side faces of each float body, and an annular connecting body for connecting the guide plates is integrally formed on an inner peripheral end of each guide plate.

When the float bodies are moving, fretting does not occur between the float bodies and the peripheral edges of rectangular holes and unstable hysteresis torque does not increase excessively by the movement of float body.

In still further embodiment of this invention; plural rectangular holes for disposing the torsion springs are formed on a pair of input-side side plates and an output-side plate located therebetween respectively, at least two torsion springs are disposed in series in each rectangular hole of the output-side plate, the side plates and the output-side plate are coupled by the torsion springs so that a torque is transmittable therebetween, a float body movable in circumferential direction is interposed between the two torsion springs located in series in each rectangular hole, and each float body is pivotally connected through a pin to annular connecting bodies disposed at radial inner sides than the float body.

When the float bodies are moving, fretting does not occur between the float bodies and the peripheral edges of rectangular holes and unstable hysteresis torque does not increase excessively by the movement of float bodies because they are connected to each other by the annular connecting bodies. Even if unbalance should exist between spring loads, the float body pivots around the pin to absorb the unbalance.

In still another embodiment of this invention; an output-side plate is separated into a flange integral with a spline hub and intermediate plates located at an outer peripheral side thereof, the intermediate plates are interposed between input-side side plates, an output-side hub is disposed at inner peripheral sides of the intermediate plates, the hub flange and intermediate annular bodies are coupled together through a first-stage torsion spring having small spring constant in such a manner that a torque is transmittable therebetween, the intermediate plates and the side plates are coupled together through a second-stage torsion spring having large spring constant in such a manner that a torque is transmittable therebetween, the intermediate plates being made of a pair of right and left thick annular intermediate plate members put together and fastened by rivets, rectangular holes for disposing second-stage torsion springs are made on outer peripheral parts of the intermediate plates, expanded parts for containing the first-stage torsion spring are formed at inner peripheral ends of the intermediate plates and a stopper mechanism for direct coupling of torque consisting of concave and convex portions is formed between the subject part and the hub flange, and friction members are interposed between the expanded parts and the side plates and between the expanded parts and the hub flange, respectively.

BRIEF DESCRIPTION OF THE DRAWINGS

FIG. 8 is a sectional view taken along a line VIII—VIII of FIG. 7.

FIG. 9 is a sectional view taken along a line IX—IX of FIG. 7.

BEST MODE FOR CARRYING OUT THE INVENTION

Embodiment 1

Figure 3:
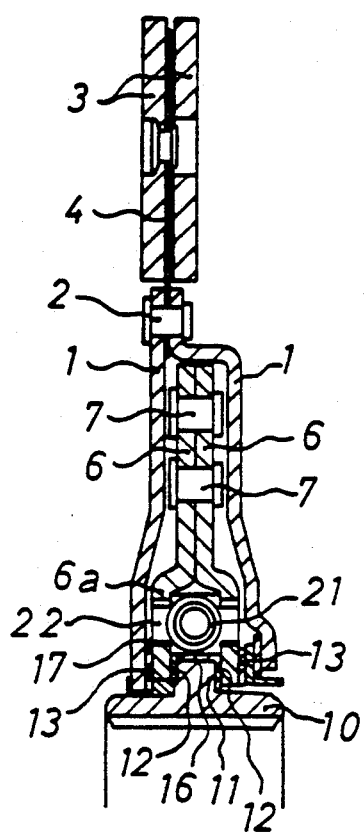
FIG. 3 is a sectional view taken along a line III—III of FIG. 1.

FIG. 3 shows the vertical sectional view (sectional view taken along the line III—III of FIG. 1) of the damper disc in which a pair of input-side side plates 1 are installed with a prescribed distance left therebetween in axial direction and their outer peripheral ends are fastened together by rivets 2. A cushioning plate 4 is secured to an outer peripheral end of side plates by the foregoing rivets 2, and input facings 3 are secured to both sides of the cushioning plate 4. The input facings 3 are held between a flywheel and a pressure plate, for example, and a torque is transmitted thereto.

Output-side plates 6, 6 are disposed between side plates 1, 1, and the output-side plates, 6 are separated into a flange 11 integral with an output-side hub 10 and out-put-side plates 6, 6 located at an outer peripheral side. The annular out-put-side plates 6, 6 are composed of a pair of thick sheet members which are fastened integrally by rivets 7. Expanded portions 6a opening in axial direction are formed on plural places of inner peripheral ends of the intermediate plates 6. The flange 11 of the output-side hub 10 is disposed in the expanded portions 6a, and the output-side hub 10 spline fits onto an output shaft, for instance.

Second-stage friction members 13 having large friction coefficient are interposed between inner peripheral sides of the intermediate plates 6 and inner peripheral sides of the side plates 1, and first-stage friction members 12 having large friction coefficient are interposed between inner peripheral sides of the intermediate plates 6 and the flange 11.

Rectangular holes (notches) 16 for first-stage springs are made on the flange 11, first rectangular holes 17 are made on the expanded portions 6a of the intermediate plates 6 correspondingly thereto, and first-stage torsion springs 21 having small spring constant are installed in the rectangular holes 16 and 17 compressively in circumferential direction. Namely, the first-stage torsion spring 21 contacts at its both ends with circumferential edges of the rectangular hole 16 of the flange 11 through spring receivers 22 which in turn extend in both axial sides to contact with circumferential edges of the first rectangular holes 17 of the intermediate plates 6.

Figure 1:
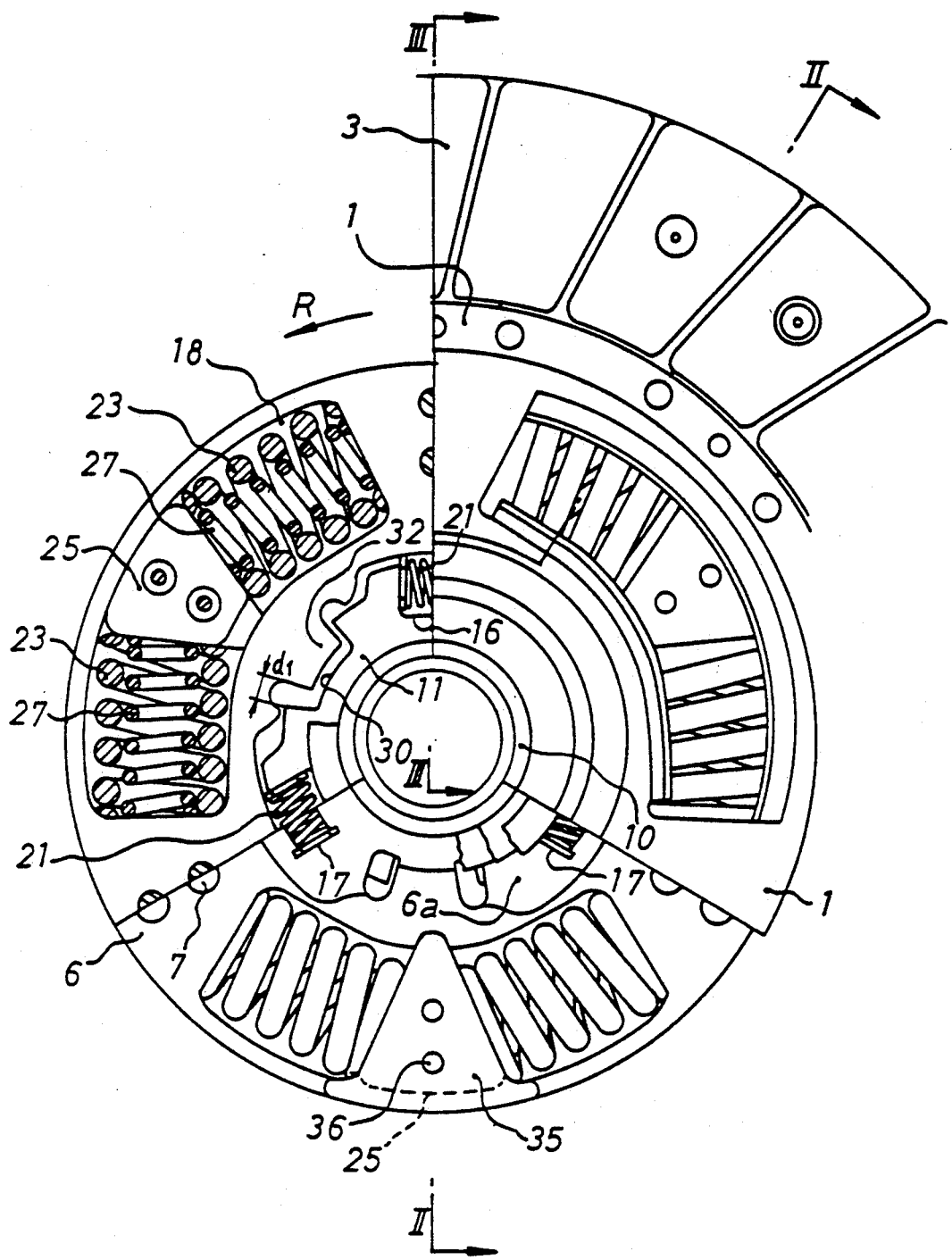
FIG. 1 is a partially fragmentary side view of a damper disc according to this invention.
Figure 2:
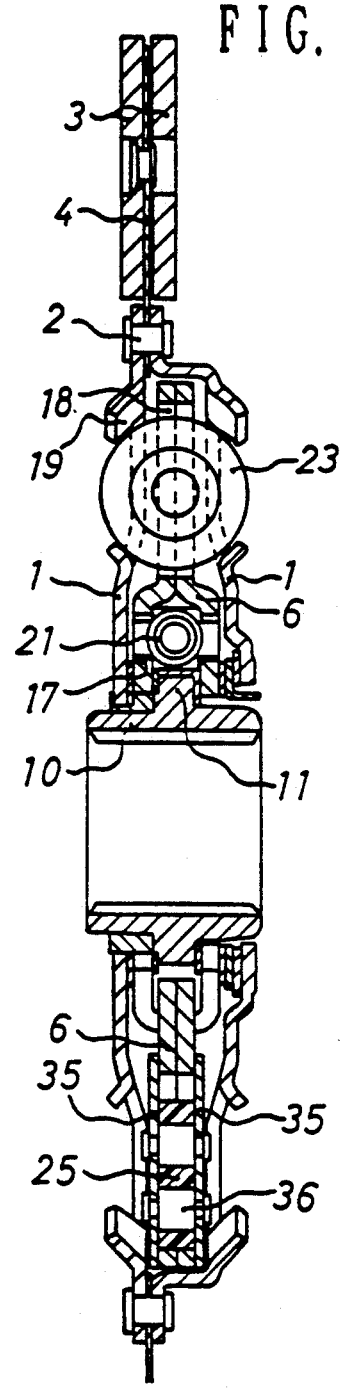
FIG. 2 is a sectional view taken along a line II—II of FIG. 1.

FIG. 2 is the sectional view (taken along a line II—II of FIG. 1) of a part other than that of FIG. 1. In FIG. 2, second rectangular holes 18 are formed on outer peripheral parts of the intermediate plates 6, rectangular holes 19 are made on the side plates 1 correspondingly to the foregoing second rectangular holes 18, and second-stage torsion springs 23 are installed in the rectangular holes 18 and 19 compressively in circumferential direction.

In FIG. 1, the second rectangular holes 18 are made at three places with equal spaces left therebetween in circumferential direction, two second-stage torsion springs 23 are disposed in series in one rectangular hole 18 in circumferential direction, and a float body 25 is interposed between the both second-stage torsion springs 23 disposed in one rectangular hole 18 in such a manner as freely movable in circumferential direction. The second-stage torsion spring 23 is of a load-and-empty-spring type having an empty spring 27 in its inside.

The rectangular holes 16 of the flange 11 are also made at three places with spaces left therebetween in circumferential direction, and recesses 30 are formed between the rectangular holes of the flange 11. On the other hand, projections 32 protruding in the recesses 30 are formed on the intermediate plates 6, thus a torsional angle range of first-stage being limited by a circumferential clearance d1 between the recesses 30 and the projections 32.

Figure 5:
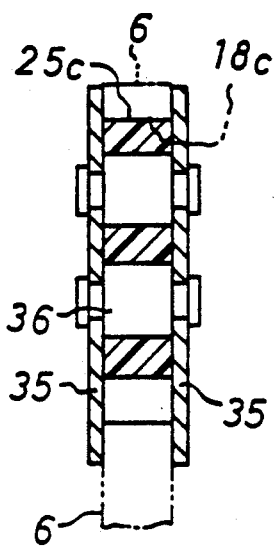
FIG. 5 is a sectional view taken along a line V—V of FIG. 4.

The float body 25 is made of hard resin having small friction coefficient such as polyamide resin etc., which is light in weight and formed into trapezoidal shape decreasing its width toward the clutch center, and its radial outer peripheral edge 25c contacts with a radial outer peripheral edge 18c of the second rectangular hole 18. Guide plates 35 are secured to both axial side faces of the float body 25 by pins 36 as illustrated in FIG. 5, both radial outside and inside end portions of the guide plate 36 extend to both side portions of the intermediate plate 6 so as to prevent the float body 25 from slipping off in axial direction.

Figure 4:
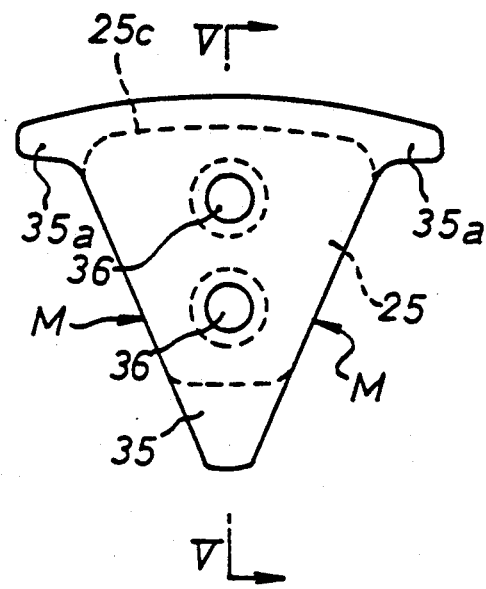
FIG. 4 is an enlarged side view of a float body.

The guide plate 35 is formed into an approximately inverted triangular shape as illustrated by FIG. 4, and a spring receiving surface with which the torsion spring 23 contacts is made flush with a spring receiving surface M of the float body 25. Stretching portions 35a which stretch in both circumferential sides are formed on radial outside ends of the guide plate 35. Steel sheet, for example, is used for material of the guide plate 35, a strength against spring force can thus be improved. The pin 36 is also made of metal.

In the embodiment as illustrated by the figures, recessed portions 30 are formed on the flange 11 of the hub 10 and projecting portions 32 are formed on a intermediate plates 6 and serve as the stopper mechanism for direct transmission of torque. However, projecting portions may be formed on the flange 11 and recessed portions may be formed on the intermediate plates 6.

Function will be described hereunder. At the time of idling, the intermediate plates 6 and the side plates 1 are integrally twisted relatively to the flange 11 of FIG. 1 in a direction identical with a rotating direction R to compress the first-stage torsion spring 21. A small hysteresis torque is generated in this instance due to rubbing of the first-stage friction members 12 located between the intermediate plates 6 and the flange 11 of FIG. 2.

When operation mode changes from idling to low-speed running, a torsional torque increases so that the recessed portions 30 of the flange 11 in FIG. 1 contacts with the convex portions 32 of the intermediate plates 6, and the side plates 1 begin twisting in the R direction to compress the second-stage torsion springs 23. A relatively large hysteresis torque is generated in this instance due to rubbing of the second-stage friction members 13 located between the intermediate plates 6 and the side plates 1 of FIG. 2.

The float body 25 of FIG. 1 is also moved in the circumferential direction when the second-stage torsion springs 23 are compressed, so that the radial outer peripheral edge 25c of the float body 25 rubs against the outside edge 18c of the rectangular hole 18. However, since the float body 25 itself is made of polyamide resin having small friction coefficient, the fretting will scarcely occur and little centrifugal force will be generated owing to its light weight.

Figure 6:
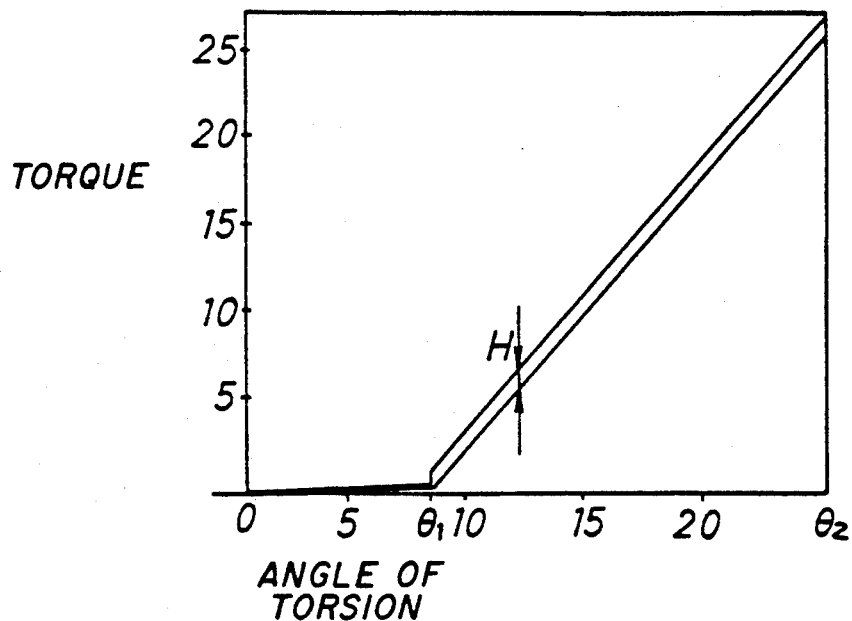
FIG. 6 is a torsional characteristic diagram.

FIG. 6 shows the torsional characteristic diagram, in which the hysteresis torque is limited to an extremely small value in a first-stage torsional angle range from 0 to $\theta 1$, and a comparatively large hysteresis torque H is generated in a second-stage torsional angle range from $\theta 1$ to $\theta 2$.

The two second-stage torsion springs 23 of FIG. 1 are disposed in series in one rectangular hole 18 so that the second-stage torsional angle range from $\theta 1$ to $\theta 2$ can be enlarged, and the booming noise at the time of low-speed running can be minimized.

The second-stage torsion spring 23 is under a fully compressed state at the maximum torsion angle $\theta 2$.

Embodiment 2

Figure 7:
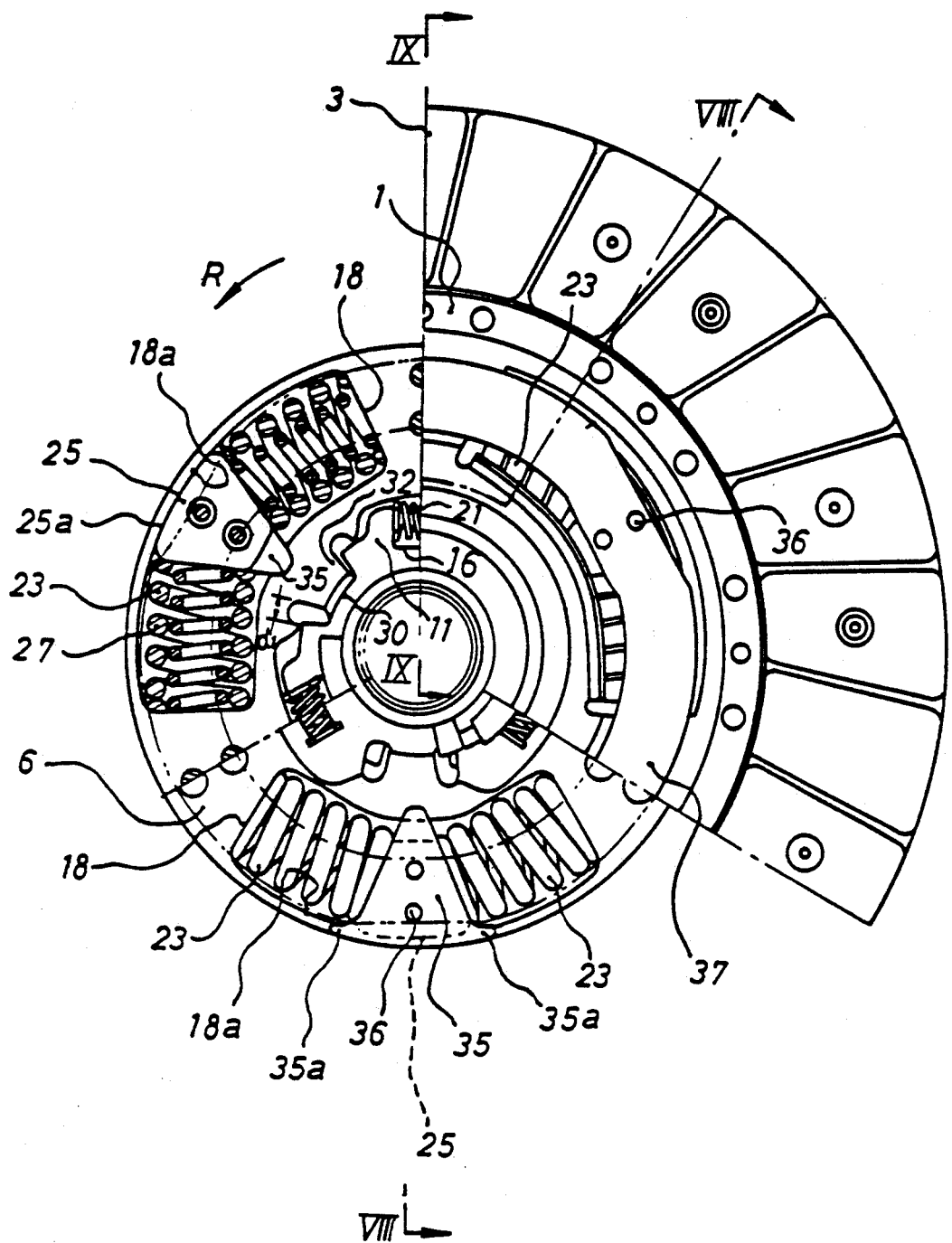
FIG. 7 is a partially fragmentary side view of a damper disc according to this invention.

In the embodiment illustrated in FIG. 7 through FIG. 9, three float bodies 25 are integrally connected at their both axial side faces by annular connecting bodies 37. A pair of connecting bodies 37 are disposed on opposite axial outsides of the side plates 1 as illustrated by FIG. 8, the portions corresponding to the floats 25 are sunk toward axially central side and secured to side face of guide plate 35 by rivet 36. The annular connecting bodies 37 are made of steel sheet for instance.

Structure, other than described above, is identical with that of the foregoing embodiment illustrated in FIG. 1 through FIG. 5, and same components are attached with the same numbers.

According to this structure, when the float body 25 of FIG. 7 is moved in the circumferential direction by the compression of the second-stage torsion springs 23, the three float bodies 25 are integrally connected by the annular connecting bodies 37 so that there is no chance for the float bodies 25 to protrude in the radial outside direction. Therefore, there is no possibility of increase in unnecessary and unstable hysteresis torque due to rubbing of the radial outside edge 25a of the float body 25 against the peripheral edge 18a of the rectangular hole 18.

Further, since the connecting bodies 37 are disposed on opposite sides of the float bodies 25, they serve also as protection covers for the second-stage torsion springs 23.

Embodiment 3

Figure 10:
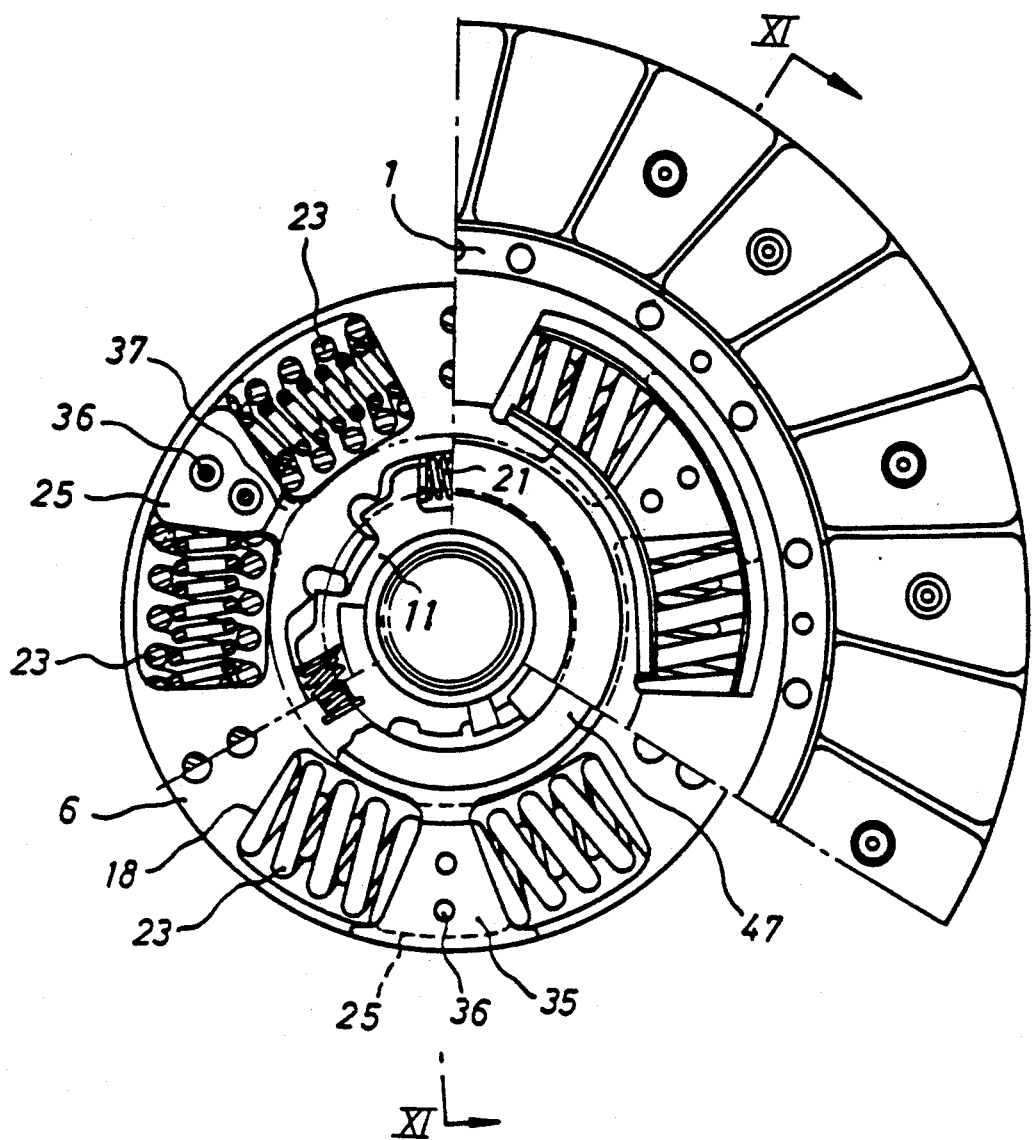
FIG. 10 is a partially fragmentary side view of a damper disc.
Figure 11:
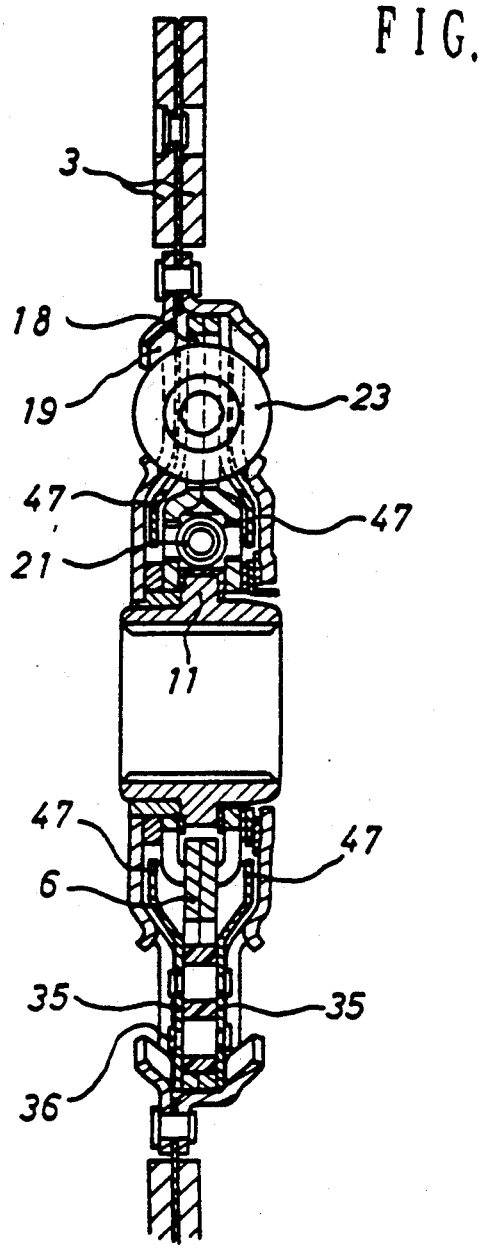
FIG. 11 is a sectional view taken along a line XI—XI of FIG. 10.

In the embodiment illustrated in FIG. 10 and FIG. 11, three float bodies 25 are carried by the guide plates 35 respectively, and inner peripheral ends of respective guide plates 35 are integrally connected by an annular connecting bodies 47. The both connecting bodies 47 are interposed between the expanded portion 6a of the intermediate plate 6 and the side plates 1 but do not contact with these plates 1 and 6. Structure other than described above is identical with that of the foregoing embodiment illustrated in FIG. 1 through FIG. 5, and the same components are attached with the same numbers.

According to this structure, when the float body 25 of FIG. 7 is moved in the circumferential direction by the compression of the second-stage torsion springs 23, the three float bodies 25 are integrally connected by the annular connecting bodies 47 so that there is no chance for the float bodies 25 to protrude in the radial outside direction. Therefore, there is no possibility of increase in unnecessary and unstable hysteresis torque due to rubbing of the radial outside edge 25a of the float body 25 against the peripheral edge 18a of the rectangular hole 18. Since the connecting bodies 47 are formed integrally with the guide plates 35, number of component can be reduced and total weight can be reduced.

Embodiment 4

Figure 12:
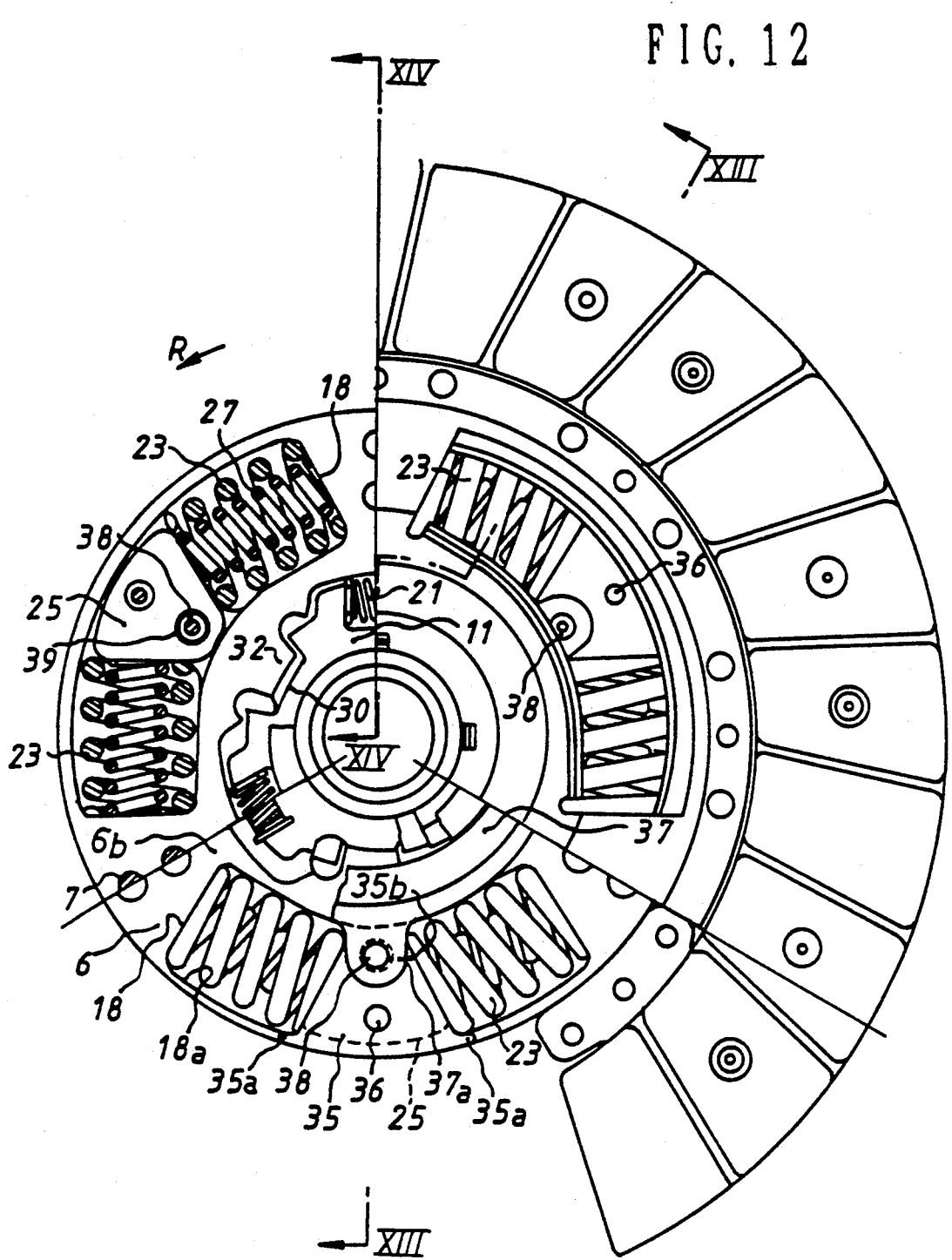
FIG. 12 is a partially fragmentary side view of a damper disc according to this invention.
Figures 13, 14:
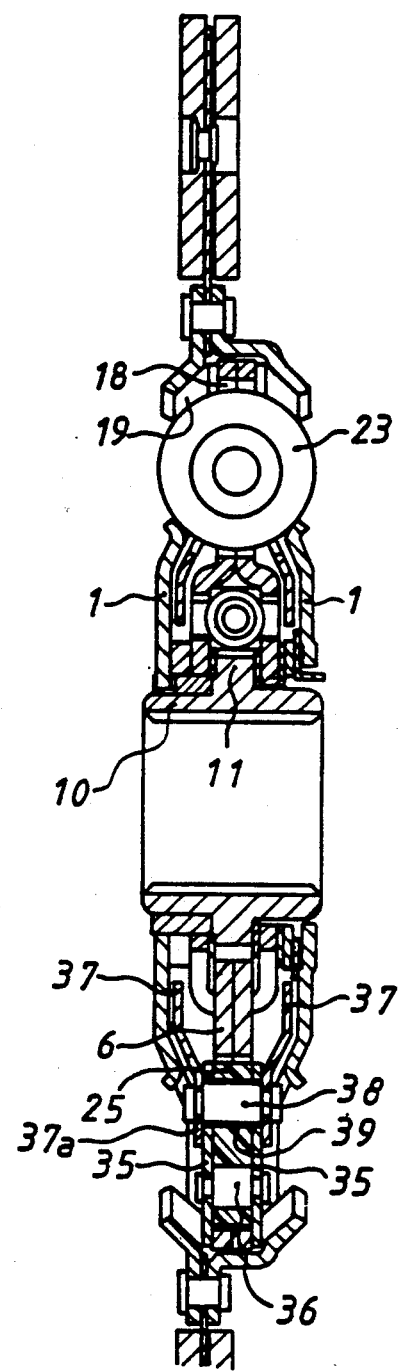
FIG. 13 is a sectional view taken along a line XIII—XIII of FIG. 1.
FIG. 14 is a sectional view taken along a line XIV—XIV of FIG. 12.

In the embodiment illustrated in FIG. 12 through FIG. 14, the foregoing three float bodies 25 and the support plates 35 are pivotally connected to the annular connecting bodies 37 through pins 38. Namely, the annular connecting bodies 37 are disposed at radial inner side than the float bodies 25 and integrally have projecting pieces 37a projecting outwardly at three places, and pin holes 39 are made at radial inside ends of the float bodies 25 and the support plates 35 as illustrated by lower half of FIG. 2. The pin 38 is inserted in the pin hole 39 of the float body 25 etc. with a radial play left therebetween, and both ends thereof are secured to the projecting pieces 37a of the annular connecting bodies 37. The annular connecting body 37 is made of steel sheet, for instance.

According to this structure, when the float body 25 of FIG. 12 is moved in the circumferential direction by the compression of the second-stage torsion springs 23, the three float bodies 25 are integrally connected by the annular connecting bodies 37 so that there is no chance for the float bodies 25 to protrude in the radial outside direction. Therefore, there is no possibility of increase in unnecessary and unstable hysteresis torque due to rubbing of the radial outside edge of the float body 25 against the peripheral edge 18a of the rectangular hole 18.

Even if unbalance exists between spring loads of the second-stage torsion springs 23, the float body 25 pivots around the pin 38 depending on the unbalance and absorbs the unbalance. Consequently, compressing motion of each second-stage torsion spring 23 becomes stable so as to provide smooth twisting motion.

Further, since the foregoing unbalance can be absorbed, durability of the plates can be secured even when a circumferential width of an inner peripheral end portion (necked portion) 35b of the support plate 35 etc. is narrowed. A necked portion 6b of the intermediate plate 6 can therefore be sufficiently widened without lessening the torsional angle range, so that durability of the intermediate plate 6 can be maintained.

Embodiment 5

Figure 15:
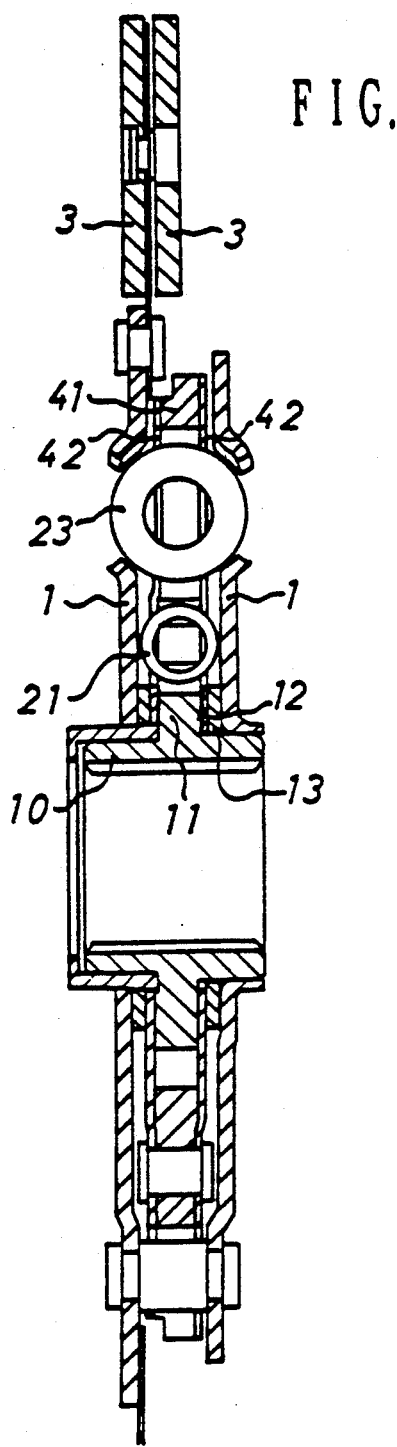
FIG. 15 is a sectional view showing another embodiment.

FIG. 15 shows the damper disc which includes an intermediate flange 41 having approximately the same width as those of the hub 10 and the flange 11 and a pair of thin sub plates 42 secured to both ends of the above. Other structure is the same as that of FIG. 1 through FIG. 5.

EFFECT OF THE INVENTION

According to this invention; the output-side plate is separated into the flange 11 and the intermediate plates 6 so that the idling noise can be minimized owing to the small rigidity and small hysteresis torque characteristic at the time of idling, and two second-stage torsion springs 23 are disposed in series in one rectangular hole so that wide torsional angle can be attained at the time of low-speed running, sufficient torque can be obtained with comparatively small rigidity, and the booming sound in low-speed running can be reduced.

The float body 25 interposed between the two torsion springs 23 is made of light-weight plastic-based material having small friction coefficient so that the fretting will scarcely be produced even when the float body 25 contacts with and slides on the edge of the rectangular hole 18 in case where the torsion spring is compressed, and the centrifugal force will be small owing to its light-weight. Consequently, there is no possibility of increase in the unstable hysteresis torque caused by the movement of the float body 25 so that the foregoing abnormal sound prevention effect can be maintained satisfactorily.

In one embodiment of the invention, the float bodies 25 interposed between the two torsion springs 23 are integrally connected by the annular connecting bodies 37 (47) and the protrusion toward radial outside due to the centrifugal force is avoided thereby, so that the float body 25 does not rub on the edge of the rectangular hole 18 at the time when the torsion springs are compressed. Consequently, there is no possibility of increase in the unstable hysteresis torque caused by the movement of the float body 25 so that the foregoing abnormal sound prevention effect can be maintained satisfactorily.

In one embodiment, the radial outer peripheral end of the output-side plate (intermediate plates 6) is formed into the annular shape so as to close the radial outer peripheral edges of the rectangular hole 18, so that large strength of the output-side plates can be maintained and their durability can be improved even though the two torsion springs are disposed in one rectangular hole 18.

The side faces of the float bodies 25 are connected by the connecting bodies 37 so that the connecting bodies 37 serve as the protection cover for the torsion springs 23 to protect the torsion springs from outsides.

In case where the guide plate 35 is formed integrally with the connecting body 47 and the connecting body 47 is disposed at the inner peripheral side of the float body 25, the number of component can be minimized and total weight can be reduced.

In case where the float bodies 25 are pivotally connected to the annular connecting bodies 37 through the pins 38, the float body 25 is adapted to pivot depending on unbalance even if the unbalance exists between the torsion springs 23 so that the compression motion of the spring 23 becomes stable and more smooth torsional performance can be provided. Further, since the pivotal motion of the float body 25 around the pin 38 can absorb the unbalance between spring loads, the width of connecting portion between the annular connecting body 37 and the float body 25 can be narrowed while maintaining the durability of the connecting portion, and the space for containing the springs 23 can be enlarged and sufficiently wide torsional angle range can be maintained.

In case where the intermediate plates 6 interposed between the output-side hub 10 and the input-side side plates 1 are constructed by fastening the pair of right and left thick annular intermediate plate members with rivets 7, by forming the expanded portions 6a for disposing the first-stage torsion springs on their inner peripheral ends, and by forming the stopper mechanism for direct coupling of torque composed of the concave and convex portions in between the hub 10 and the flange 11 and the cost of each component is reduced.

Further, the pair of thick intermediate plates 6 are installed, the expanded portions 6a are formed on their inner peripheral ends, and the friction members 13 and 12 are disposed between the expanded portions 6a and the side plates 1 and between the expanded portions 6a and the hub flange 11; so that the hysteresis torque become stable.

INDUSTRIAL APPLICABILITY

The damper disc according to the present invention can provide a wide torsional angle range and stable hysteresis torque so that it is most suitable for an automobile damper disc.

What is claimed is:

1. A damper disc having an output-side plate and input-side side plates, said output-side plate having a spline hub, a hub flange integral with said spline hub and intermediate plates at an outer end and peripheral sides of said hub flange, said intermediate plates being interposed between said input-side side plates and said hub flange, said spline hub being disposed at inner peripheral ends of said intermediate plates and said input-side side plates, first-stage torsion springs between said hub flange and said intermediate plates, said first-stage torsion springs having a small spring constant for transmitting torque between said intermediate plates and said hub flange, aligned second-stage torsion springs having a large spring constant disposed in series in circumferentially spaced rectangular holes in outer peripheral portions of said intermediate plates and aligned holes in said input-side side plates for transmitted torque between said input-side side plates and said intermediate plates, said intermediate plates being fastened together by rivets, a float body movable in circumferential direction of said damper disc and disposed between said aligned second stage torsion springs disposed is series in said rectangular holes, expanded parts for said first-stage torsion springs formed at inner peripheral ends of said intermediate plates, a stopper mechanism having engagable recessed and projecting portions formed on said inner peripheral ends of said intermediate plates and said outer end of said hub flange, respectively, with a clearance between said recessed and projecting portions when said first-stage torsion springs are not compressed and for engagement with each other in the direction of compression of said first-stage torsion springs when said first-stage compression springs are compressed for compressing said second-stage torsion springs, and friction members interposed between said intermediate members and said side plates and between said intermediate members and said hub flange, respectively, said float body being made of light plastic-based material having a small friction coefficient.

2. A damper disc as recited in claim 1, wherein, a radial outer peripheral end of said intermediate plates are formed into an annular shape for closing radial outside edges of each of said rectangular holes, said float body having side plates integrally connected by annular connecting bodies.

3. A damper disc as recited in claim 2, in which said float body includes guide plates secured to opposite axial side faces of each float body, and an annular connecting body connecting said guide plates integrally formed on an inner peripheral end of each said guide plates.

4. A damper disc as recited in claim 2, wherein said float body is pivotally connected through a pin to annular connecting bodies disposed at radial inner sides of said float body.

* * * * *